(12) United States Patent
Monteiro

(10) Patent No.: US 7,077,951 B2
(45) Date of Patent: Jul. 18, 2006

(54) VESSEL FOR HEATING AND FILTERING WATER

(76) Inventor: André Monteiro, 41 Cambridge Road, Little Abington, Cambridge, CB1 6BL (GB)

(*) Notice: Subject to any disclaimer, the term of this patent is extended or adjusted under 35 U.S.C. 154(b) by 66 days.

(21) Appl. No.: 10/483,875

(22) PCT Filed: Jul. 25, 2002

(86) PCT No.: PCT/GB02/03410

§ 371 (c)(1),
(2), (4) Date: Jan. 14, 2004

(87) PCT Pub. No.: WO03/011088

PCT Pub. Date: Feb. 13, 2003

(65) Prior Publication Data

US 2004/0178131 A1 Sep. 16, 2004

(30) Foreign Application Priority Data

| Jul. 25, 2001 | (GB) | .................. 0118040.5 |
| Nov. 27, 2001 | (GB) | .................. 0128463.7 |
| Jan. 5, 2002 | (GB) | .................. 0200231.9 |
| Mar. 25, 2002 | (GB) | .................. 0206973.0 |

(51) Int. Cl.
*B01D 27/02* (2006.01)

(52) U.S. Cl. ............... 210/136; 210/184; 210/282; 210/416.3

(58) Field of Classification Search ............ 210/136, 210/175, 244, 251, 282, 416.3, 184
See application file for complete search history.

(56) References Cited

U.S. PATENT DOCUMENTS

| 4,066,551 A | * | 1/1978 | Stern ........................... 210/282 |
| 4,151,092 A | | 4/1979 | Grimm et al. ............... 210/256 |
| 4,196,081 A | * | 4/1980 | Pavia ............................ 210/94 |
| 5,362,385 A | * | 11/1994 | Klegerman et al. ......... 210/136 |
| 5,524,791 A | | 6/1996 | Credle, Jr. et al. ........ 222/129.1 |
| 5,577,638 A | | 11/1996 | Takagawa ................. 222/185.1 |
| 5,733,448 A | | 3/1998 | Kaura .......................... 210/258 |
| 5,860,354 A | | 1/1999 | Jouatel et al. ................. 99/286 |
| 6,136,188 A | * | 10/2000 | Rajan et al. ................. 210/244 |
| 6,178,290 B1 | | 1/2001 | Weyrauch et al. ........... 392/445 |
| 6,202,541 B1 | * | 3/2001 | Cai .............................. 99/286 |
| 6,553,894 B1 | | 4/2003 | Hamon et al. ................ 99/286 |
| 6,715,616 B1 | | 4/2004 | Kataoka ...................... 210/474 |

FOREIGN PATENT DOCUMENTS

| EP | 0 897 686 A1 | 2/1999 |
| GB | 1 436 111 | 5/1976 |
| GB | 2 294 631 A | 5/1996 |
| GB | 2 334 665 A | 9/1999 |

* cited by examiner

Primary Examiner—Ivars C. Cintins
(74) Attorney, Agent, or Firm—Brinks Hofer Gilson & Lione

(57) ABSTRACT

A vessel or kettle for holding water has a first chamber from which water can be pumped though a filter into a second chamber. The pump can be gravity, manual or power operated. Cold water from the first chamber can be pumped though an annular filter of ion exchange resins into the second chamber where it can be heated. The contents of filter can be held in a replaceable porous bag. A meter can indicate the amount transferred, eg in multiples of a volume such as a cupful. The vessel can have a spout valve that selectively allows the first chamber to be filled or water to be poured from the second chamber. The first chamber and/or the pump can be external to the vessel. The pump can include non-return valves and a siphon system.

23 Claims, 12 Drawing Sheets

Pouring

VESSEL FOR HEATING AND FILTERING WATER

BACKGROUND OF THE INVENTION

Jug kettles used to boil water for the making of instant coffee or tea have been around for many years. The jug is filled with tap water, the kettle is connected to the electrical cord or base (which is permanently connected to the mains) and the switch is turned on. When the water starts to boil, steam will trip a bimetallic temperature switch turning off the electrical element at the bottom of the kettle. The water is now ready to be poured.

There are some variants of this design some of which are common to most kettles. The use of a flat electrical heating element at the bottom of the jug is a popular design. This makes cleaning lime scale build-up easier.

In another variant, the element is switched off by the use of a bimetallic strip in contact with the bottom of the kettle and not through the use of vapour.

There is also the variant where the temperature at which the electrical element is switched off is controllable through the use of a tuning knob on the bimetallic strip. This allows the water to be heated to below 100 C which can reduce scalding. Many of these types of devices are familiar to users and will not be described in any more detail.

Conventional kettles have got two main problems. Firstly, if the kettle is filled to the top, it will take a long time, around 3 or 4 minutes, for the water to boil. Often, the only requirement is however for one or two cups of boiling water. However if the kettle is only filled a little bit from the bottom (enough for a cup or two), there is a constant requirement to be re-filing the kettle. It is also difficult to judge the required amount of water while filling.

The second problem is the lime scale that precipitates out of hard tap water as the water is heated. This deposits on the kettle requiring either cleaning or in self cleaning kettles the precipitate will wash out in larger white scales that can drop out at the bottom of the kettle with the last water. The lime scale will also produce a scum on the coffee or tea making the drink look unpleasant. The removal of other types of pollutants in the tap water can also be important.

There are on the market water filters and even water filters combined with a kettle have been recently introduced (for example from Brita). These however, working by gravity, take quite a while for the water to filter through and do not provide a method of positively displacing the water required to be heated.

SUMMARY OF THE INVENTION

The problems described above can be solved in the present invention a kettle separates the required level of water to be heated from the filling jug and heats only this amount. This radically cuts down both the waiting time and the energy spent on heating the water, while the filling jug can be filled to the top when required.

Secondly, it provides an in-built ion exchange and activated carbon filter that removes both lime scale and other water pollutants providing for a scum free, safe and better tasting coffee, tea or just high quality drinking water for the refrigerator. This can also be used on a water filter alone where no heater is present.

According to a first aspect of the invention there is provided a filtered-water dispenser comprising first and second tanks connected via a filter and a pump operative to transfer the contents of the first tank through the filter to the second tank.

In a first aspect of the invention the appliance is used as a water filter, using the extra speed provided by the pumping system to accelerate the water purification. This applies to all embodiments of the invention as the only difference between the filter and filter kettle is the use of a heating element in the kettle.

An embodiment of the invention uses a controllable valve to measure the amount of water that passes from the first tank to the second. More specifically this could be a constant flow valve working on a timer or a valve working using a chamber of fixed volume and siphon like a toiled cistern, for example. The chamber could contain the volume of a cup or a known fraction of a cup. In such an arrangement the first tank needs to be positioned generally higher than the second tank so that the water will naturally flow by gravity through the valve system.

Another embodiment of the invention uses a piston pump and a set of non-return valves providing both pumping and a measurement system for the transfer of water from the first tank to the second. Here the valves could be spring loaded to prevent leaks from the first tank to the second. Both the first tank and the pump do not need to be in the main vessel of the appliance but can be separated from it and connected through a pipe. This could make the jug lighter for the user. There is no need now for the first tank to be positioned higher than the second. The collection point on the first tank should still be at its lowest point to be able to collect all the water there to the pump.

The piston pump is preferably operated by a hand plunger. On the preferred embodiment the pump is connected though a filter which the water goes through before reaching the second chamber. Such hand pump uses a system of non-return valves which preferably are spring loaded to prevent leaks. In an alternative arrangement the valves could be of the flexible membrane type. Since this type is no spring loaded it requires another system to prevent any water leaks. Such leaks from the first tank to the second will not occur if for example a siphon system is used such that the water needs to raise to a point above the highest point in the first tank before being channeled to the second.

In the case of a hand pump, mechanical leveraging means can be applied to increase the force on the piston in order to overcome the pressure drop in the system mainly in the filter. The hand pump could also be of the rotary vane type where one rotation represents a fixed volume passed through the pump.

On a preferred embodiment of the invention the piston pump and valve system are located at the bottom of the first tank and generally above the second tank. The piston working in a cylinder corresponding to the volume of a cup of coffee or a known fraction off a cup and the valves being of the flexible membrane type are surrounded by the filter which is of an annular type. This allows a good packaging arrangement as well as a large cross-section for the filter working at the larger diameters.

On such preferred embodiment the filling system into the first tank and pouring from a spout connected to the second tank in the filter or kettle appliance is performed through a system of ball valve on the water admission into the first tank and a flap valve on the pouring from the spout. Such arrangement allows filling and pouring from the same spout without the need to manually actuate any device by the user.

On such a system the first admission valve is of the membrane type and is formed by using a plurality of holes in the piston at a radius greater than that of a support hub but less that the internal diameter of the cylinder. Such holes allow the water through when the piston is moved inside the first water tank on an upstream direction, causing a deflection of the flexible membrane which is supported at the hub on the downstream side of such piston.

The end of the pump cylinder further downstream is closed and is perforated with a plurality of holes at a similar diameter to those of the piston. It too has a flexible membrane on its underside that can cover these holes when the water moves in one direction. Thus when the piston is moved in the downstream direction the first admission valve is now closed but the second valve at the end of the cylinder allows the water through into the filter chamber. After the filter chamber and before the second tank a siphon system as described earlier should be used to prevent any leaks through the flexible valves since these are not spring loaded.

The filter must retain the filtering material while allowing the water to pass through and come into contact with such material. For this to happen the filtering material must be contained inside a mechanical filter barrier or it will be washed away with the water into the second tank. This can be done either by using two filter barriers one at the entry point into the filter and one at the exit point, or by containing the filter material inside a porous bad which constitutes the barrier itself.

If the filter cartridge is made to open and close by the user the filtering material can be removed and replaced with new one. This can be done in bulk from a container having the filter material or in the case of the bag system, the old bag can be removed and a new one moved into its place inside the filter.

In the case of an annular filter that may be placed around the pump assembly as described, the filter bag would also possess an annular, doughnut shape that would fit inside the filter housing.

BRIEF DESCRIPTION OF THE DRAWINGS

Embodiments of the invention will now be described, by way of example only with reference to the accompanying drawings in which:

FIG. 9*a* shows the kettle during the filling from the spout.

FIG. 9*b* shows the up-stroke of the pump.

FIG. 9*c* shows the down stroke of the pump.

FIG. 9*d* shows the heating stage.

FIG. 9*e* shows the pouring from the spout.

DESCRIPTION OF PREFERRED EMBODIMENTS

Figure 1:
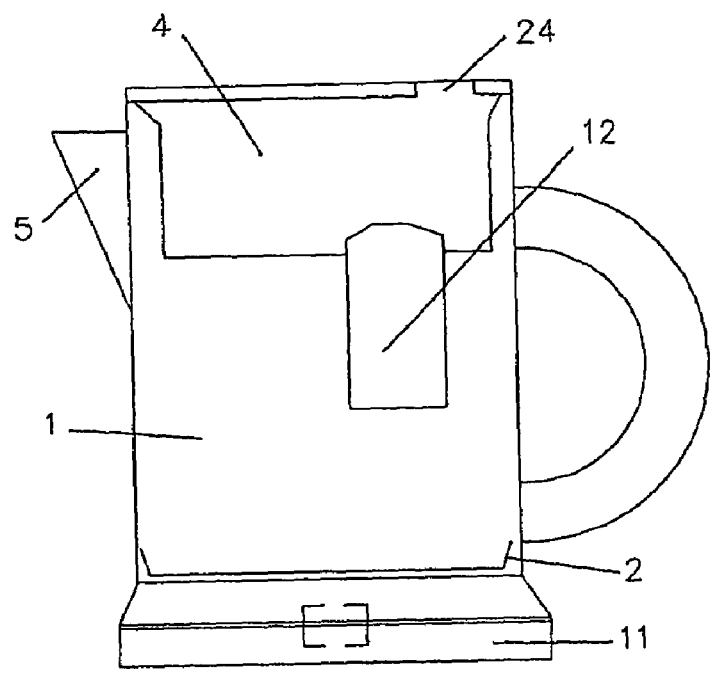
FIG. 1 describes a known jug kettle with a separate water tank and a flat heating element.

FIG. 1 shows a known jug kettle 1 which can be removed from its base station 11 and possesses a flat heating element at the bottom 2. The jug also has at the top a separate water reservoir 4 and a gravity fed water filter 12, allowing water filtration into the bottom of the jug before heating takes place. Pouring will happen as normal from the spout which is in communication with the bottom of the kettle. The cold water tank, 4, is fed through an opening in the top lid.

Figure 1A:
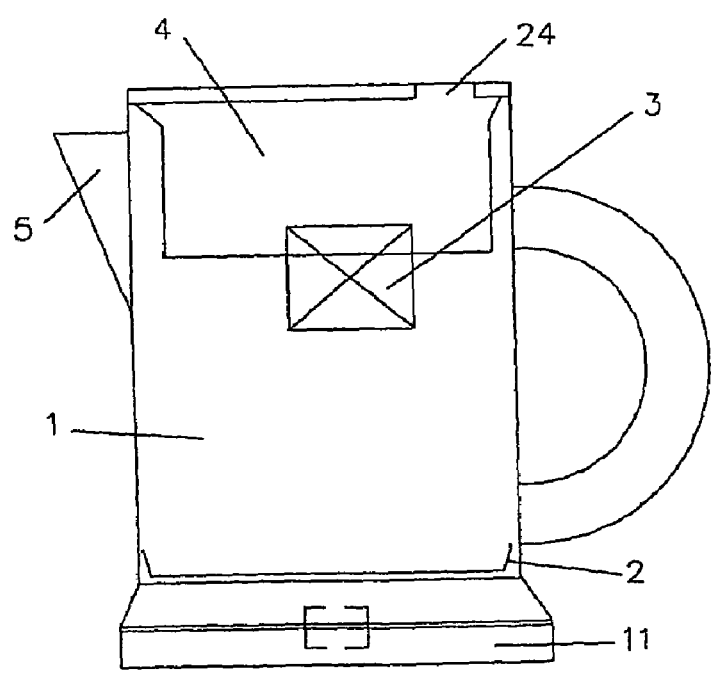
FIG. 1*a* describes a jug kettle having a separated water reservoir 4 and a controllable valve 3 which allows a measured amount of water to fall from the water tank 4 to the bottom of the kettle to be heated.

FIG. 1*a* describes a jug kettle having a separated water reservoir 4 and a controllable valve 3 which allows a measured amount of water to fall from the water tank 4 to the bottom of the kettle to be heated. This allows the user to completely fill tank 4 without having to heat all this water nest time the kettle is used. The amount of water to be heated is only the quantity required and is measured and released by valve 3.

Figure 2:
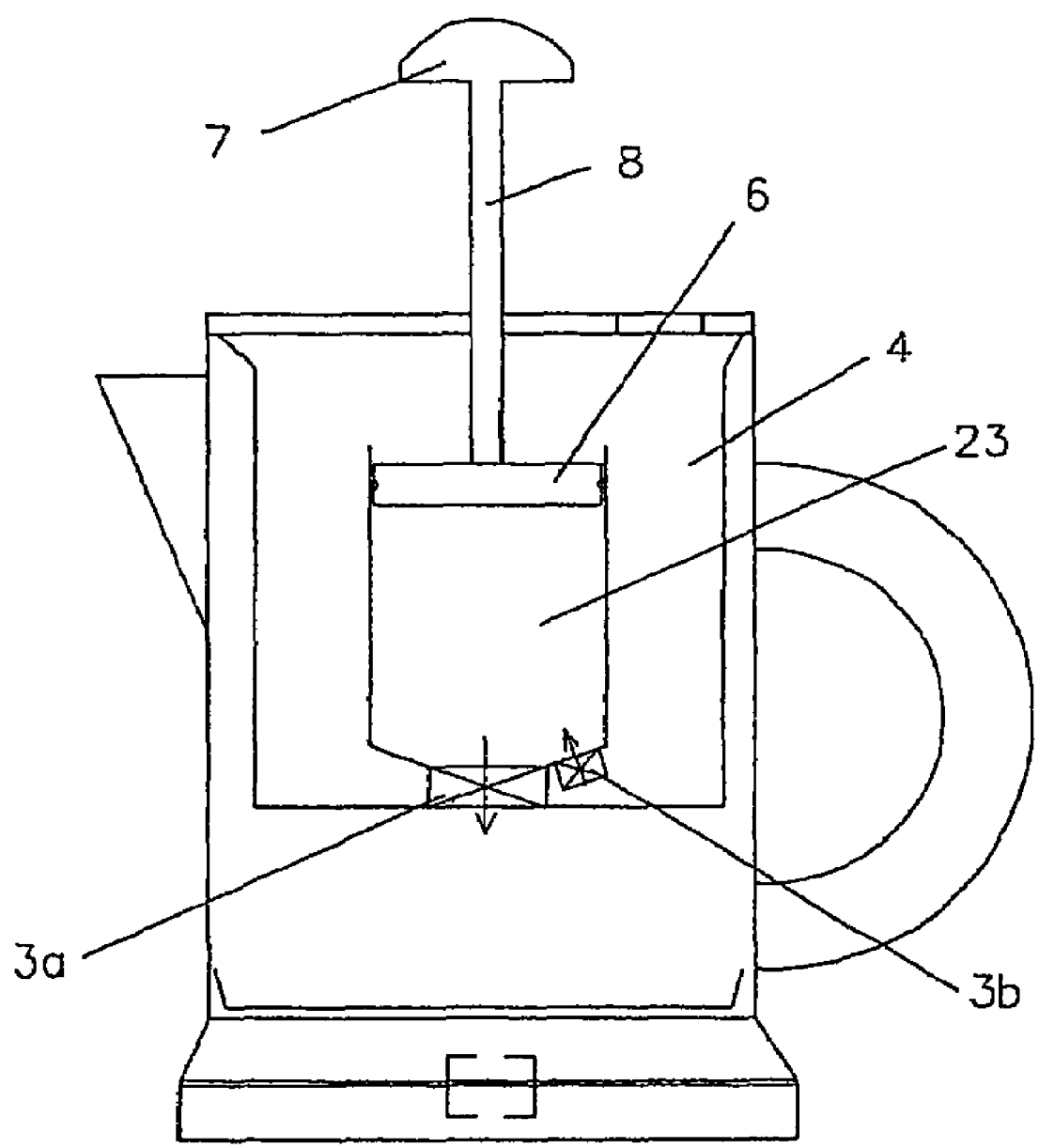
FIG. 2 is a jug kettle, according to the invention, with a separate water tank with an inbuilt water pump.

FIG. 2 shows a kettle according to the invention which uses a small piston type pump and in which components which are similar to components of the known kettle of FIG. 1 are given the same reference numerals. In the presence of two one way valves 3*a* and 3*b* water is scooped from the bottom of the water tank 4 on the up movement of the piston 6 and discharged into the bottom section of the kettle when the piston moves down. The displacement volume of the piston provides an easy measure of the water to be heated. This displacement volume could be the typical volume of a mug or cup. Force is provided by the user via the handle 7 connected through the piston through rod 8.

Figure 3:
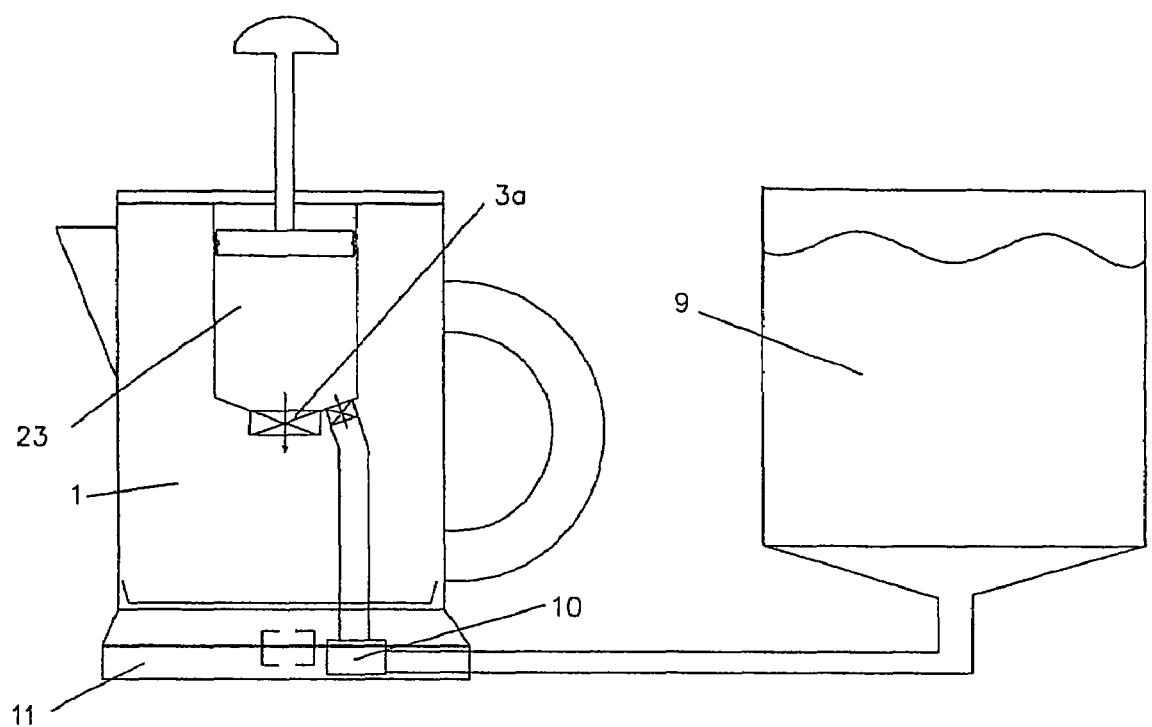
FIG. 3 illustrates a jug kettle according to the invention, where the water tank is separate from the jug, but the pump is still on the kettle unit.

FIG. 3 describes a similar kettle to FIG. 2 but where the water tank 9 is a separate unit from the kettle. It is connected to the base station 11, through a special connector 10 to the inlet of the pump. When pouring, the jug can be lifted from the base station and thus separated not only from the electrical supply but also from the water line for convenience.

Figure 3B:
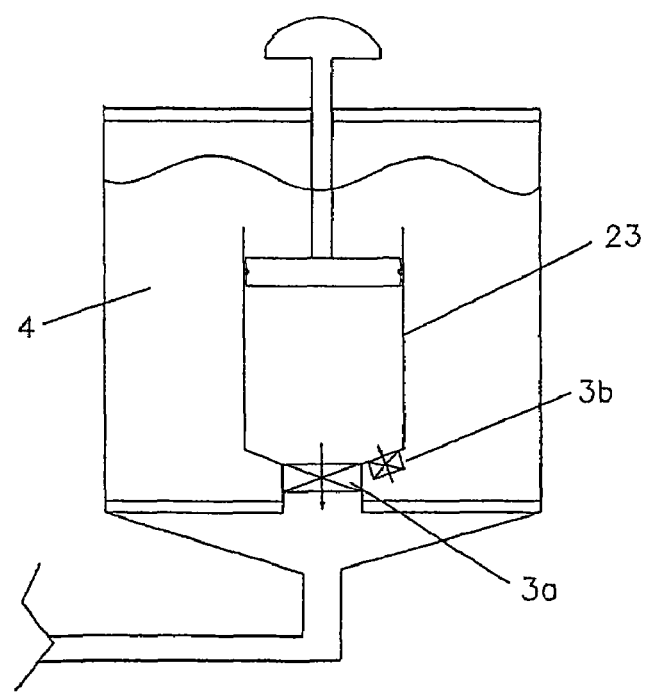
FIG. 3*b* is a similar arrangement with a separate tank but where the water pump is placed together with the separate water tank.

FIG. 3*b* is a similar arrangement to FIG. 3 but the water pump 23 is located in the separate water tank.

Figure 4:
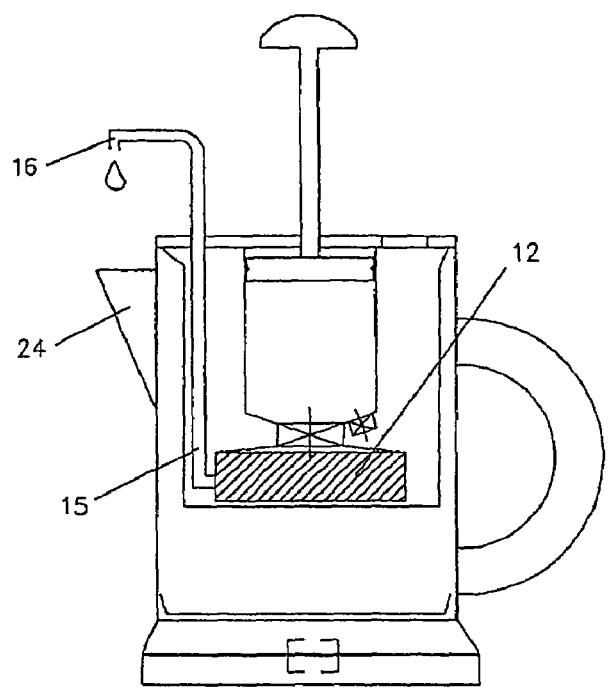
FIG. 4 illustrates a jug kettle, according to the invention, with a separate tank and a water filter combination.

FIG. 4 describes a similar kettle where the outlet of the water pump is connected to a water purification filter 12. Here a typical mixture of ion exchange resins and activated carbon which is a well known type of water filter, removes the minerals that cause the water to be "hard" as well as metal pollutants and other chemicals that produce an aroma or can be harmful to health.

Figure 4B:
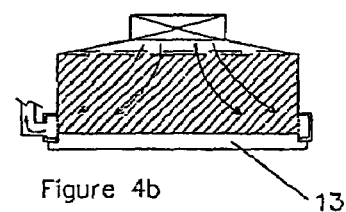
FIG. 4*b* illustrates a filter vessel, containing bulk filtration material, that can be substituted for the filter cartridge shown in FIG. 4.

Filter 12 can be a self contained filter incorporating a typical plastic cartridge shown in FIG. 4 or it can be a vessel with two filters, one at the entrance to the filter vessel after the pump and the other at the exit point of the filter vessel 13, entrapping the bulk filtration material but allowing the water through, as shown in FIG. 4b. Here the resin mixture is poured into the vessel 13 and a cap is then screwed on. The resin is thus supplied in bulk and replaced by the user once it is exhausted. FIG. 4 also shows the output of the filter system. Here tube 15 is raised inside the kettle up to a spout 16 which drops the water above the normal kettle spout 24. This allows the user to check that the water is reaching the bottom of the kettle so that it can be heated. It also allows the user to collect this purified water to a separate container, for example, as drinking water to place in a refrigerator.

Figure 5:
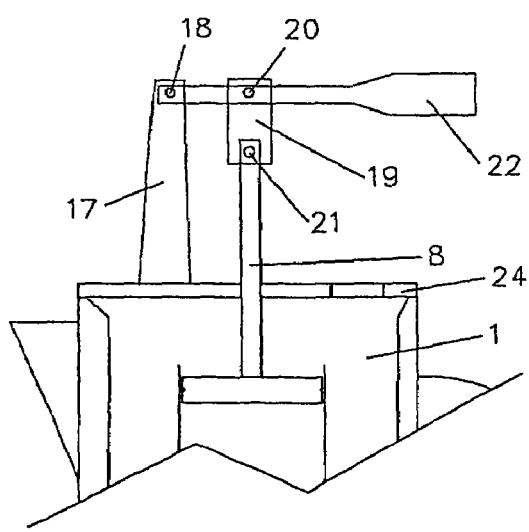
FIG. 5 describes a more powerful type of hand pump for a jug kettle system according to the invention.

FIG. 5 provides a hand pump where the rod 8 is connected through a link 19 to arm 22. Arm 22 is pivoting on point 18 supported by part 17 on the cover of the water vessel 24. This arrangement amplifies the force exerted at the end of handle 22 along well known principles, making the pumping action easier or faster.

Figure 6:
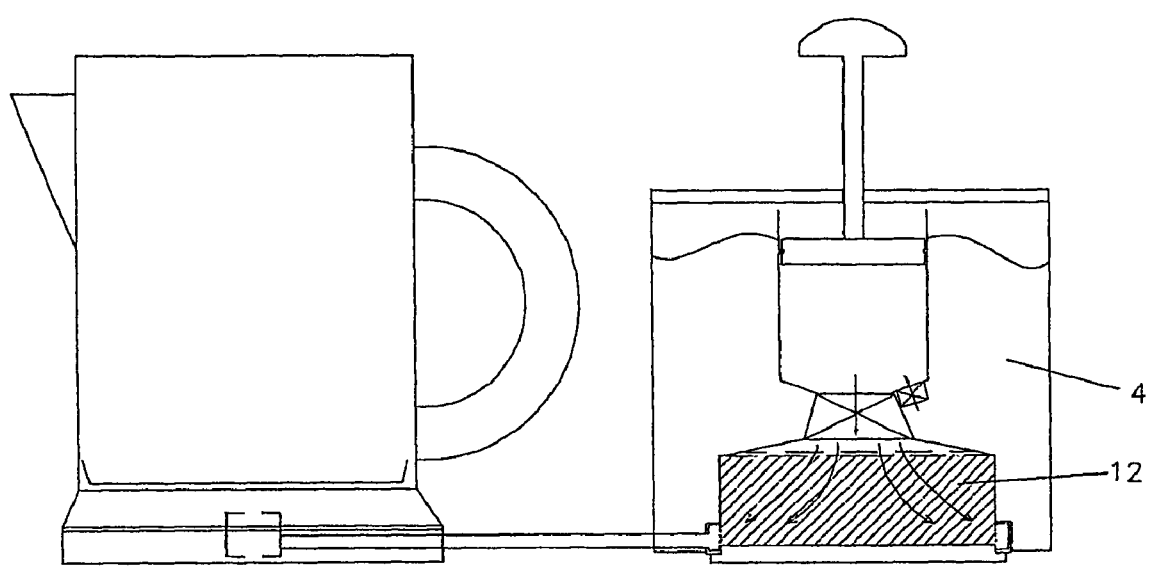
FIG. 6 describes the more powerful hand pump associated with the water tank according with the invention. Both the mains power and water feeding to the base disconnect from the jug upon pouring.
Figure 7:
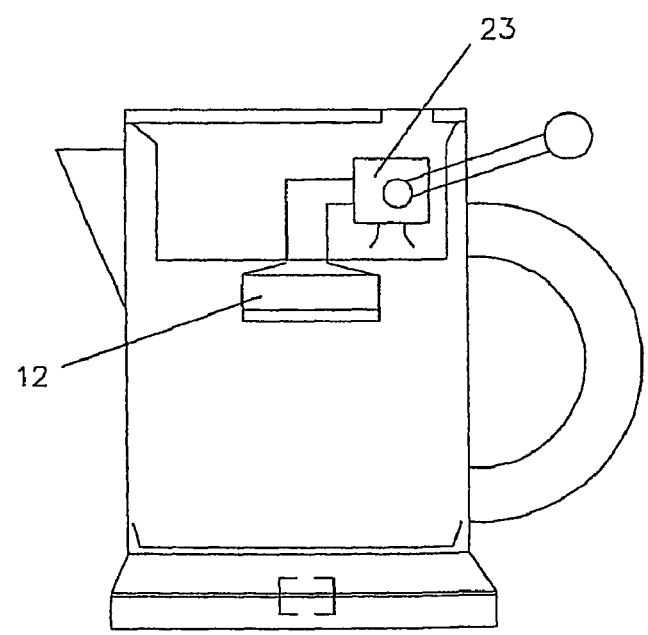
FIG. 7 describes a kettle, according to the invention, with a separate tank and a water filter using another type of manually operated pump (a rotary hand pump).

In FIG. 6 the separate water tank 4 is associated with its own hand pump and filter which pump and filter work in a substantially similar way to those described above. A different variant of the kettle described in FIG. 7 uses a rotary pump connected to a handle or operated by an electric motor.

Figure 8:
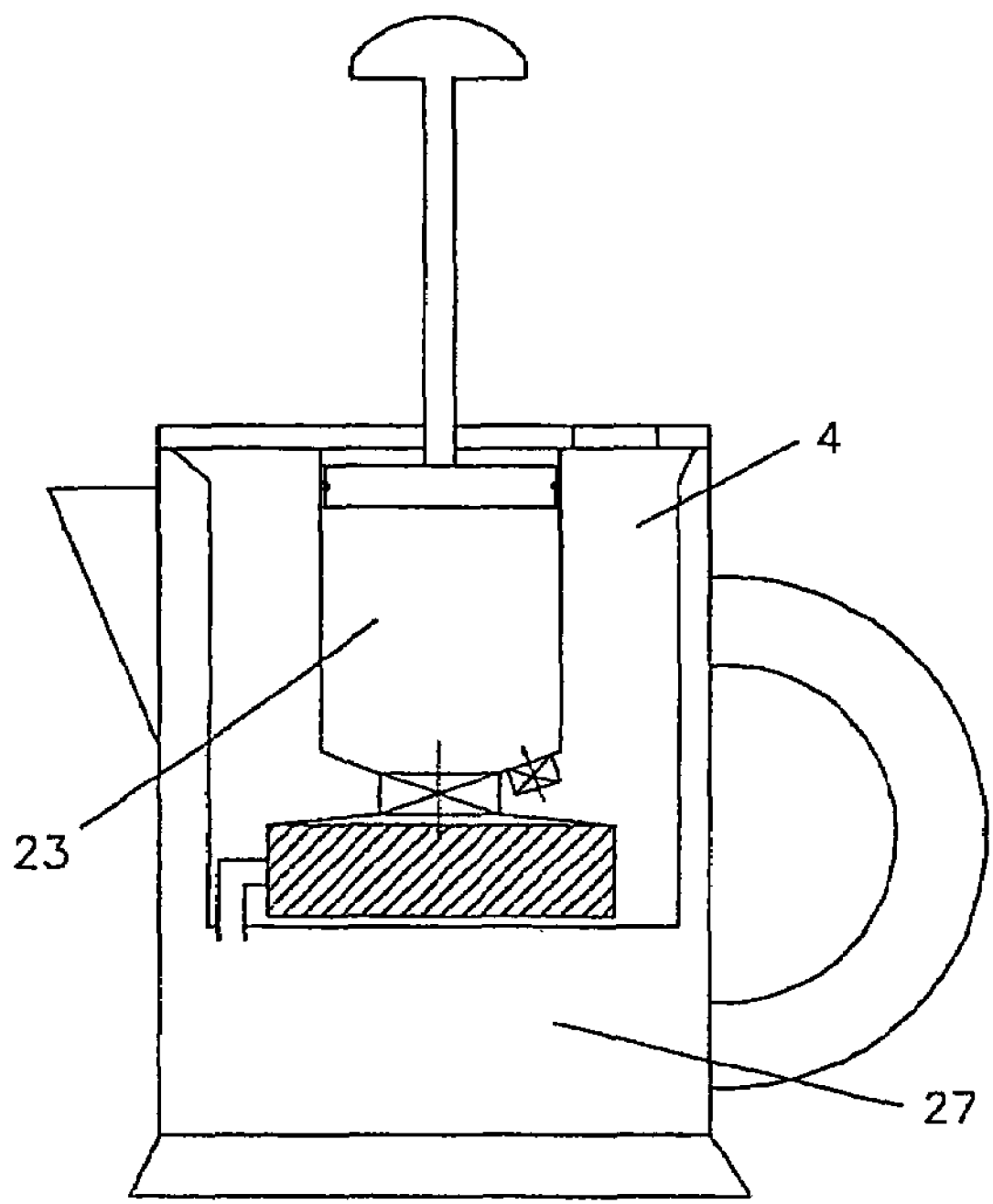
FIG. 8 describes a stand alone water filter appliance, according to the invention, with an associated pump to speed the water filtration.

In a different embodiment of this invention, FIG. 8, the water tank 4, the pump 23 and the jug constitutes a stand alone water purification system. There is no heating element 2 as this is not a kettle. The water just rests at the bottom of the unit 27 until it is poured away into a glass or for example storage in the refrigerator. The advantage of such a system is the greater speed provided by the pump in purifying the water in relation to well known water filter jug systems.

FIGS. 9a to 9e show a more advanced embodiment of the invention. Here water contained in holding tank 4 is admitted into the pump through valve 3b. Valve 3b is a simple rubber membrane or equivalent acting in the bottom surface of the piston surface. The piston contains holes to allow the water through when the membrane is pushed away. It is thus open on the upward movement of the piston. Similarly a second valve, 3a, again formed by a plate with holes and a rubber membrane underneath, which forms the bottom of the cylinder pump, opens on the down ward movement of the piston.

Valves 3a and 3b are not spring loaded. They thus leak easily. To prevent leakage as the water passes through the filtration chamber containing the ion exchange resins 12 it is directed up siphon system 28. The water will go up and down this channel and down into the flat bottom of the kettle. When left alone the water will reach the same level in the siphon channel as on the water tank 4. Any leakage through the valves is thus contained. The same principle can be used on a forced water filtration system independent of the kettle.

FIGS. 9a to 9e also show a special spout containing two valves 30 and 31. Here spout 24 leads to holding tank 4 through a ball valve 33 arrangement similar to a snorkel. The bottom of the spout 34 is in communication with the main tank 1 of the kettle. Spout 24 has two non return valves inside and in close contact to it. In this embodiment valve 30 is a light flap valve pivoting around axis 32. Valve 31 is formed by a stainless steel ball or other dense sphere, contained in a housing 37.

When the kettle is substantially in the horizontal position the ball rests at the end of the housing opposite valve seat 38. When the kettle is tilted forward for pouring, the ball is in contact with seat 38 blocking the flow of water from tank 4 to the spout.

Figure 10:
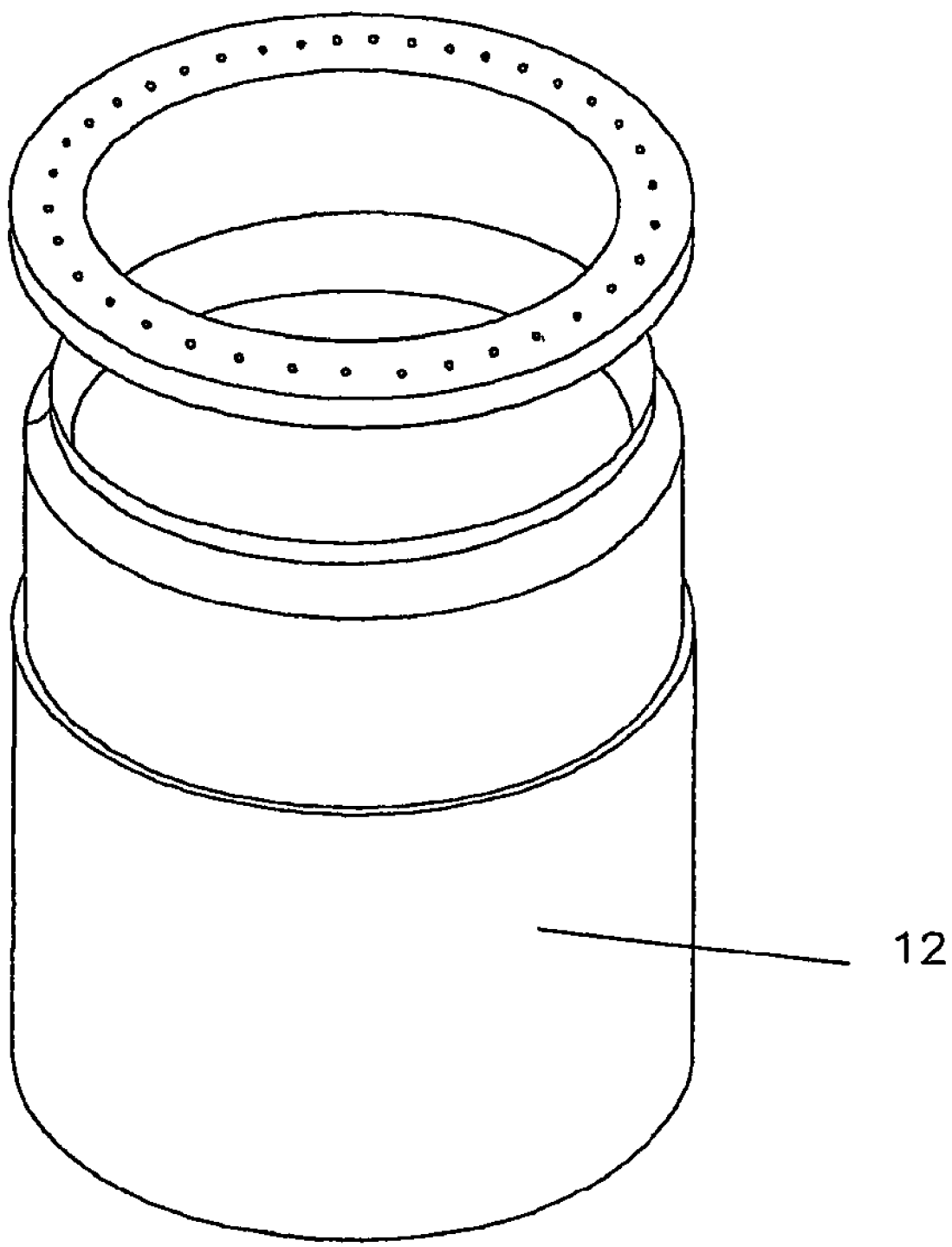
FIG. 10 shows a filter bag being placed inside a filter housing of a kettle, according to the invention.

If the kettle's spout is placed under running water for example from a tap 35, flap valve 30 remains close while valve 33 is open. As a consequence the water fills holding tank 4, FIG. 10a. The kettle is then operated in the way described before.

Figure 9A:
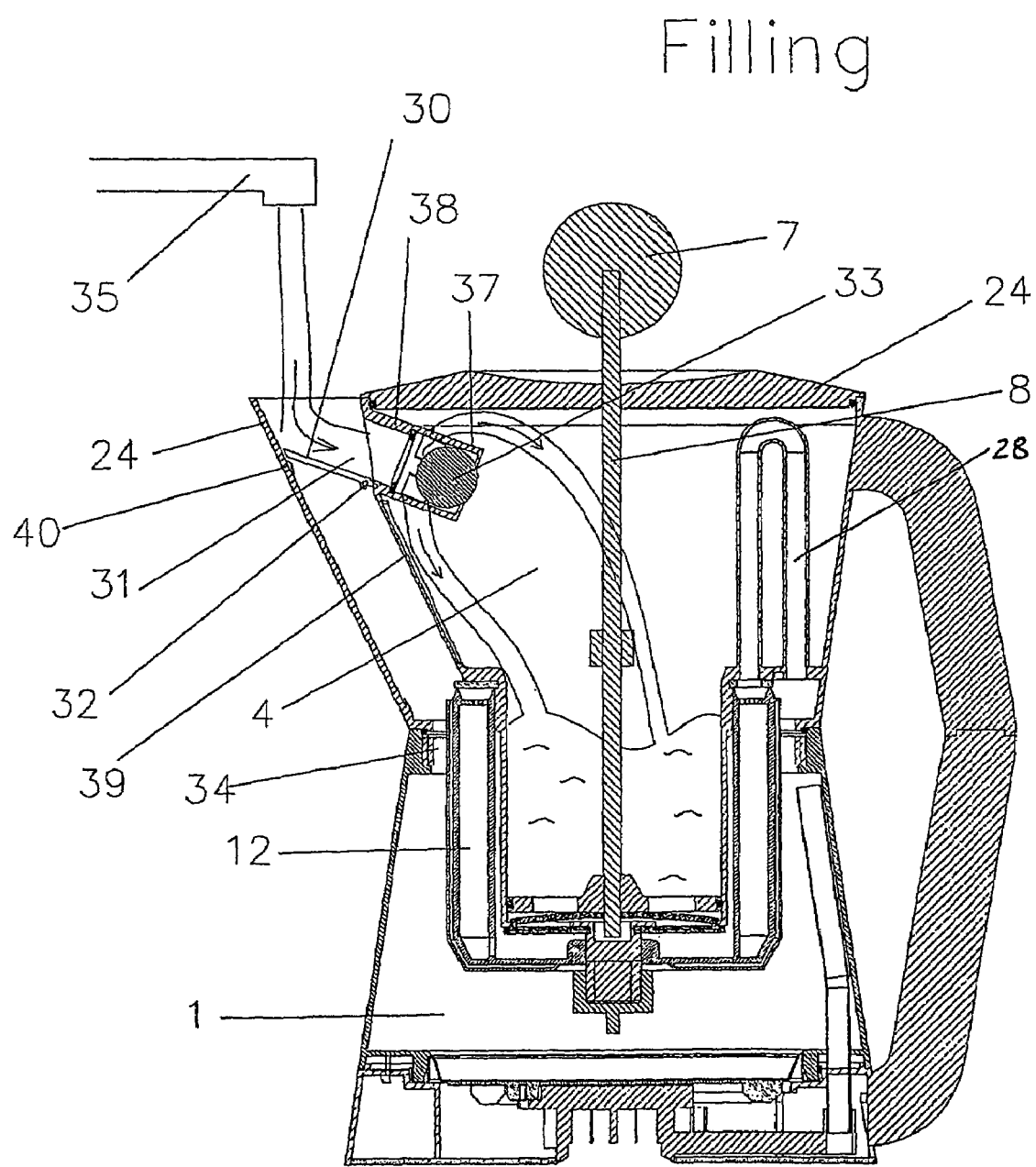
FIGS. 9*a* to 9*e* shows a filter kettle, according to the invention, using a piston as a hand pump and measurement system as well as other advanced features.
Figure 9B:
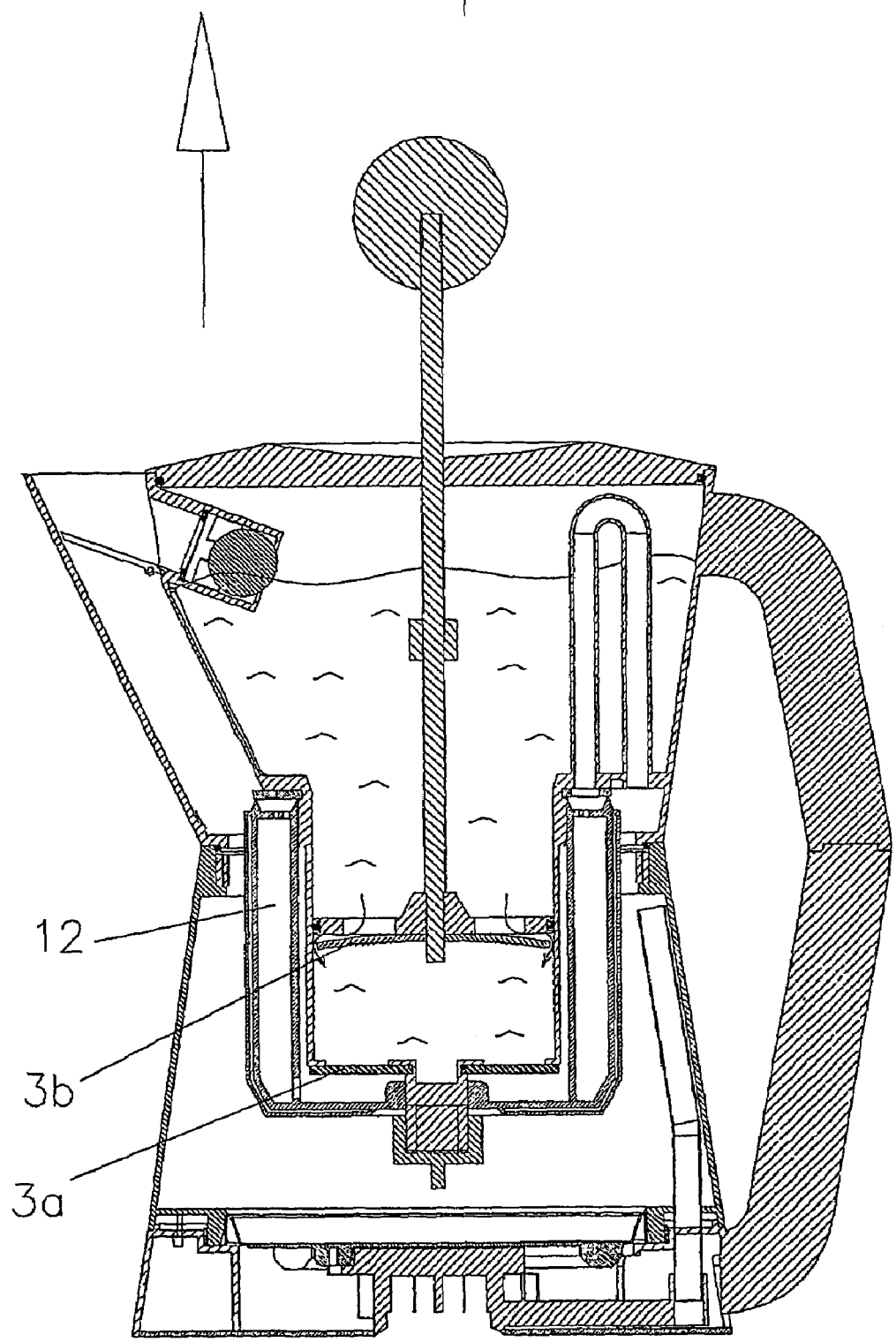
Figure 9C:
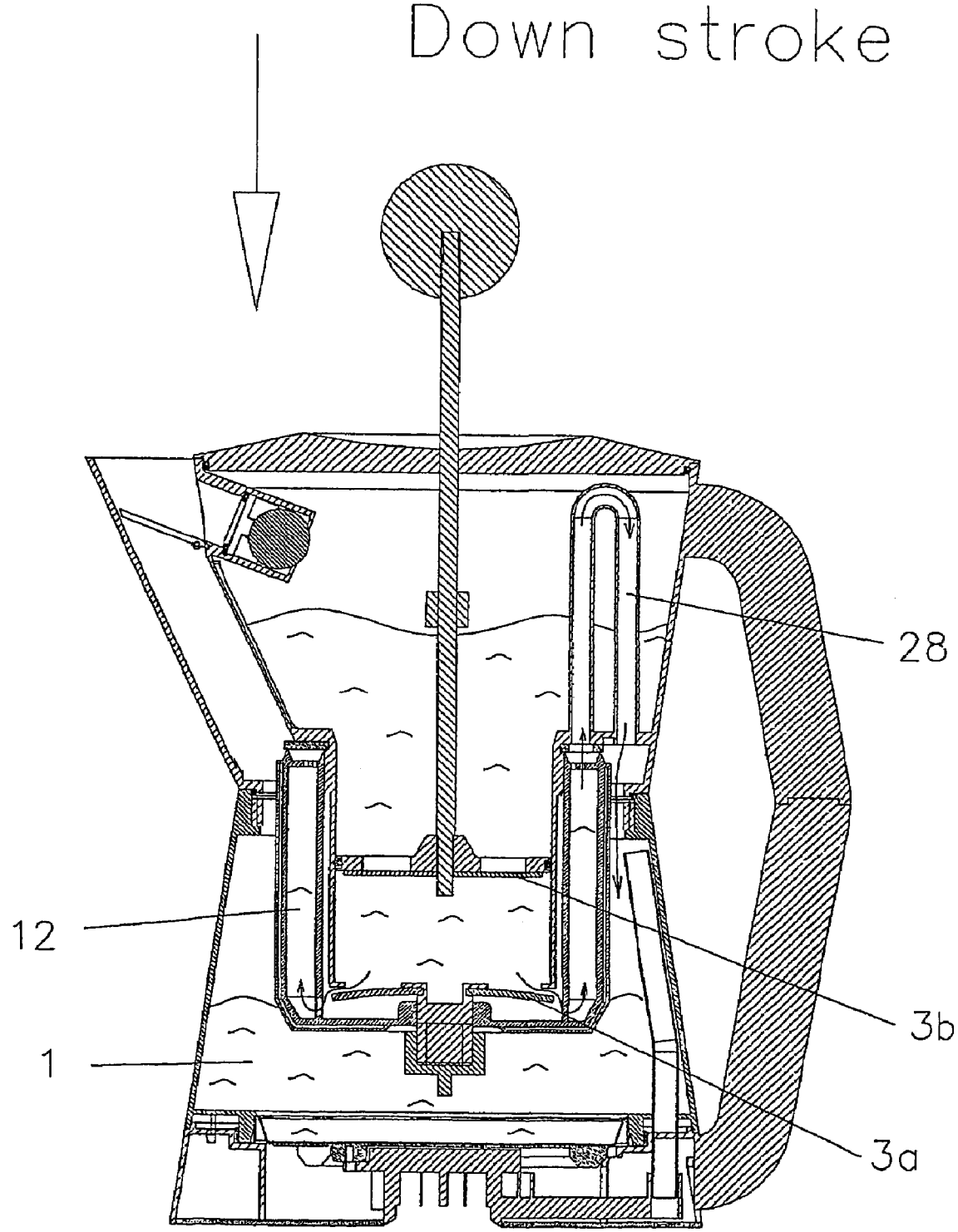
Figure 9D:
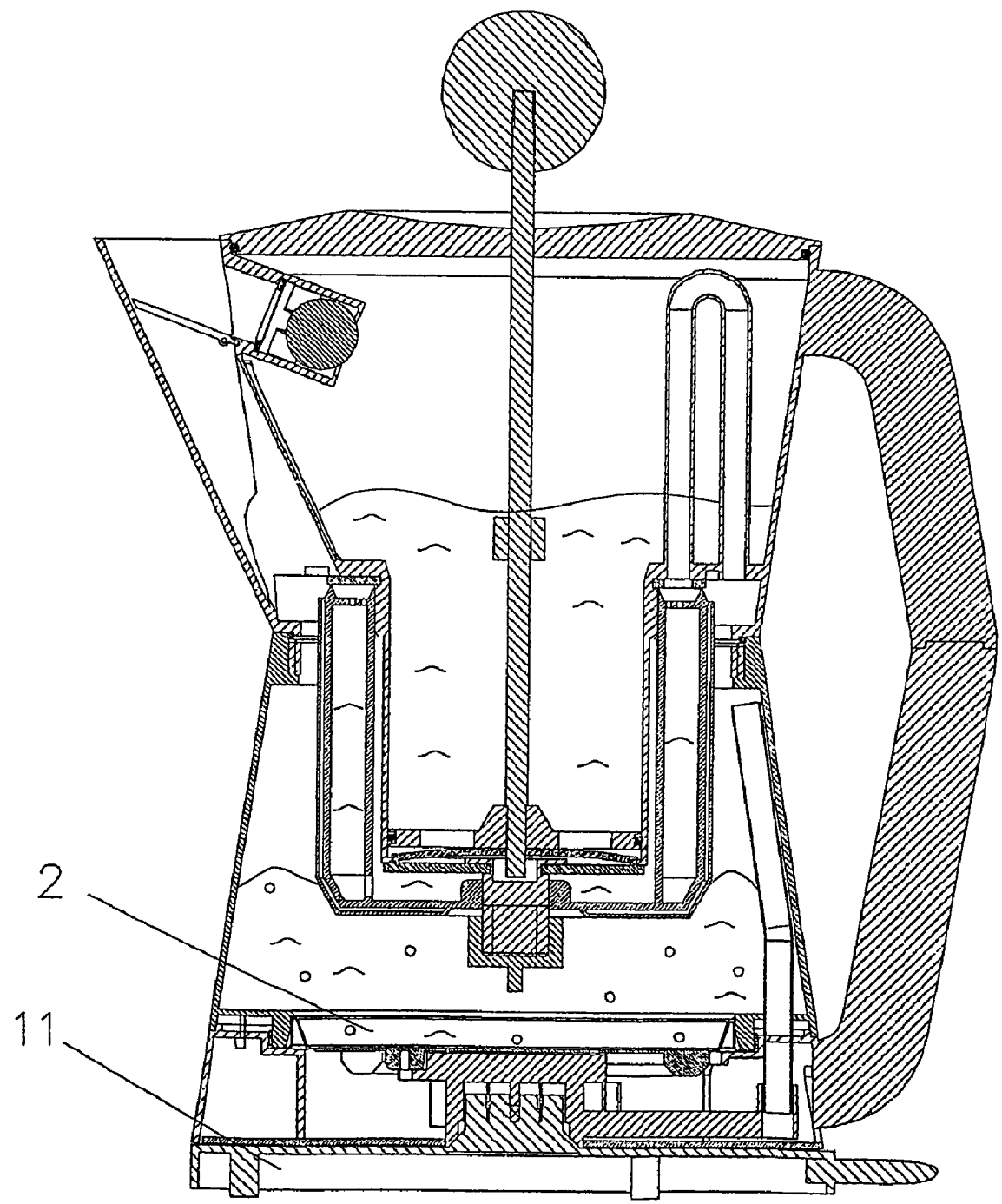
Figure 9E:
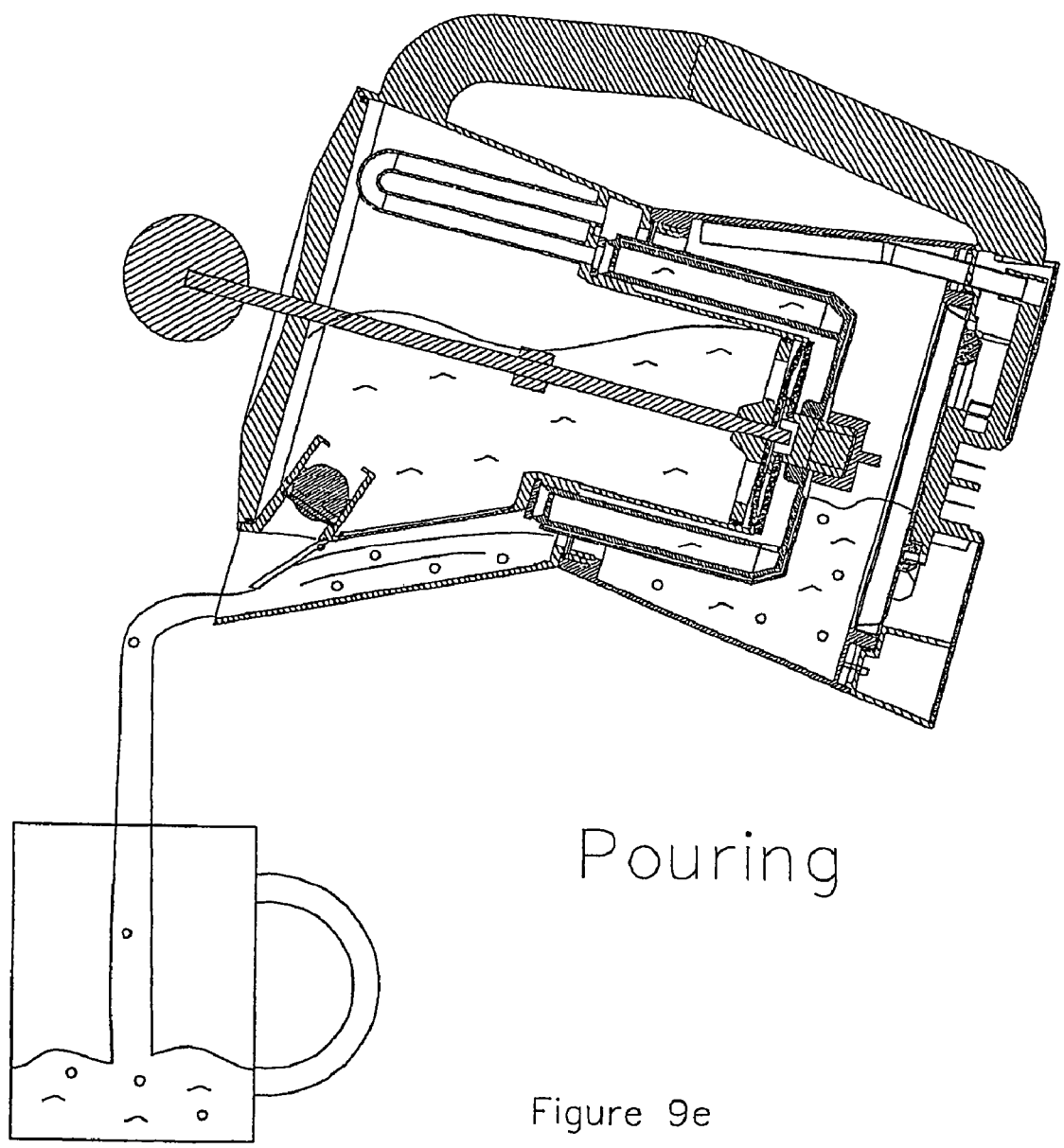

After the water has boiled and the kettle is tilted for pouring, ball 33 closes tank 4's exit to the spout, while flap valve 30 opens under the weight of the water allowing normal pouring from the kettle's bottom, FIG. 9e. Such an arrangement does not need a special filling point for holding tank 4 as it can be filled and poured in a normal way. It is understood that valves 30 and 31—could be made in different ways and consist of different types in order to perform the function described above, which is just a particular embodiment of the invention.

In FIGS. 9a to 9e the action of the piston pump could be replaced with an electric pump and an electronic volume flow measurement system. That way, when the user wants to heat up a known number of cups of water, the control system incorporating a volume flow sensor, a simple timer, a revolutions counter on a fixed displacement pump or similar device, will activated the pump so as to transfer the correct amount of water through the filter system and into the heating chamber.

The filter 12 described in the previous figures can be designed to be a complete cartridge that is thrown away when spent, or it can be a chamber that can be opened and refilled with fresh filtration material when the old one is spent. When just replacing the filtration material on a reusable filter, at least two ways of operating can be devised. The "resin" can be replaced either in bulk, as described earlier, or contained in bags formed of a filter like cloth containing the required amount of material, FIG. 10.

In the case of a bag reusable filter, upon opening the filter chamber, the old filter bag would be replaced by a fresh one containing new material. The filter like "cloth" bag would contain the filter material inside while at the same time allowing the water to pass through to be filtered. In the form of a porous bag the substitution of the filtration material is cheaper than that of a plastic cartridge and more environmentally friendly. It is also a lot easier than replacing filtering material in bulk. In the case of a filter chamber as the one described before the filter bag replacement would have the shape of an annular bag containing the resins, FIG. 10. This bag fits snugly inside the filtration chamber.

The invention claimed is:

1. A filtered-water dispenser comprising first and second tanks connected via a filter, a positive displacement pump manually-operative to transfer a controlled volume of the contents of the first tank through the filter to the second tank, the pump having a working volume within the first tank defined by a piston situated in a cylinder, a seal providing contact between the piston and the cylinder, and two valves for allowing water to flow in a determined way in and out of the pump, and an electric heating element associated with the second tank that can be switched on to boil the water in said second tank.

2. A filtered-water dispenser according to claim 1 wherein the pump working volume is a multiple of the volume of one cup.

3. A filtered-water dispenser according to claim 1 wherein the piston includes a surface having a plurality of holes and a flexible membrane situated on the piston such that water can flow through the piston holes and around the flexible membrane on an upstream movement of the piston but not on a downstream movement of the piston.

4. A filtered-water dispenser according to claims 1 or 3 wherein the cylinder includes a closed end having a plurality of holes and a flexible membrane on the cylinder closed end such that the water can flow through the cylinder holes and around the flexible membrane situated on the cylinder closed end on a downstream movement of the piston but not on an upstream movement of the piston.

5. A filtered-water dispenser according to claim 1 or 3 wherein the filter substantially surrounds the pump cylinder.

6. A filtered-water dispenser according to claim 5 wherein the filter comprises a cartridge that can be replaced in bulk.

7. A filtered-water dispenser according to claim 6 wherein the filter comprises material contained in a porous bag situated within a filter chamber, the filter chamber having a closable opening permitting replacement of the porous bag including any material contained therein.

8. A filtered-water dispenser according to claim 7 wherein the filter material is a mixture of ion exchange resins and activated carbon.

9. A filtered-water dispenser according to claim 1 or 3 further comprising a siphon tube defining a water path between said first and second tanks, the siphon tube being situated such that no water will flow between the two tanks when the pump is not actuated.

10. A filtered-water dispenser according to claim 1 or 3 further comprising a spout having a valve system allowing the filling of said first tank as well as pouring from the second tank through the spout, the valve system preventing any flow of water from the first tank out through the spout during pouring from the second tank, the valve system functioning without operator intervention.

11. A filtered-water dispenser according to claim 10 where the valve system comprises a ball check valve between the spout and the first tank and a flap valve between the spout and the second tank.

12. A filtered-water dispenser according to claim 1 or 3 wherein the first tank, pump and filter are located separately from but operatively connected to the second tank and heater.

13. A filtered-water dispenser comprising first and second tanks connected via a filter, a pump manually-operative to transfer the contents of the first tank through the filter to the second tank, the pump having a working volume within the first tank defined by a cylinder and a piston situated in the cylinder, a seal providing contact between the piston and the cylinder, and two valves for allowing water to flow in a determined way in and out of the pump, and an electric heating element associated with the second tank that can be switched on to boil the water in said second tank.

14. A filtered-water dispenser according to claim 13 wherein the piston includes a surface having a plurality of holes and a flexible membrane situated on the piston such that water can flow through the piston holes and around the flexible membrane on an upstream movement of the piston but not on a downstream movement of the piston.

15. A filtered-water dispenser according to claims 13 or 14 wherein the cylinder includes a closed end having a plurality of holes and a flexible membrane on the cylinder closed end such that the water can flow through the cylinder holes and around the flexible membrane situated on the cylinder closed end on a downstream movement of the piston but not on an upstream movement of the piston.

16. A filtered-water dispenser according to claim 13 wherein the filter substantially surrounds the pump cylinder.

17. A filtered-water dispenser according to claim 16 wherein the filter comprises a cartridge that can be replaced in bulk.

18. A filtered-water dispenser according to claim 17 wherein the filter comprises material contained in a porous bag situated within a filter chamber, the filter chamber having a closable opening permitting replacement of the porous bag including any material contained therein.

19. A filtered-water dispenser according to claim 18 wherein the filter material is a mixture of ion exchange resins and activated carbon.

20. A filtered-water dispenser according to claim 13 further comprising a siphon tube defining a water path between said first and second tanks, the siphon tube being situated such that no water will flow between the two tanks when the pump is not actuated.

21. A filtered-water dispenser according to claim 13 further comprising a spout having a valve system allowing the filling of said first tank as well as pouring from the second tank through the spout, the valve system preventing any flow of water from the first tank out through the spout during pouring from the second tank, the valve system functioning without operator intervention.

22. A filtered-water dispenser according to claim 21 where the valve system comprises a ball check valve between the spout and the first tank and a flap valve between the spout and the second tank.

23. A filtered-water dispenser according to claim 13 wherein the first tank, pump and filter are located separately from but operatively connected to the second tank and heater.

* * * * *